(12) United States Patent
Yasunaka et al.

(10) Patent No.: US 8,149,533 B2
(45) Date of Patent: Apr. 3, 2012

(54) LOAD/UNLOAD CONTROL METHOD AND APPARATUS FOR A MAGNETIC DISK DRIVE

(75) Inventors: Shigen Yasunaka, Kawasaki (JP); Satoshi Kuwahara, Fuchu (JP); Shinji Takakura, Yokohama (JP); Yoshiyuki Ishihara, Kawasaki (JP)

(73) Assignee: Kabushiki Kaisha Toshiba (JP)

( * ) Notice: Subject to any disclaimer, the term of this patent is extended or adjusted under 35 U.S.C. 154(b) by 63 days.

(21) Appl. No.: 12/842,850

(22) Filed: Jul. 23, 2010

(65) Prior Publication Data

US 2011/0019299 A1 Jan. 27, 2011

(30) Foreign Application Priority Data

Jul. 24, 2009 (JP) ................. 2009-173506

(51) Int. Cl.
*G11B 21/12* (2006.01)
(52) U.S. Cl. .................... 360/75; 360/78.09
(58) Field of Classification Search .............. None
See application file for complete search history.

(56) References Cited

U.S. PATENT DOCUMENTS

| | | | | |
|---|---|---|---|---|
| 5,949,608 A * | 9/1999 | Hunter | ............ | 360/78.09 |
| 6,097,564 A * | 8/2000 | Hunter | ............ | 360/78.09 |
| 6,229,663 B1 | 5/2001 | Yoneda et al. | | |
| 6,490,120 B1 * | 12/2002 | Burton et al. | ......... | 360/78.09 |
| 6,496,319 B1 * | 12/2002 | Kusumoto et al. | ........ | 360/75 |
| 6,512,650 B1 * | 1/2003 | Tanner | ............ | 360/75 |
| 6,563,660 B1 | 5/2003 | Hirano et al. | | |
| 6,771,480 B2 * | 8/2004 | Brito | ............ | 360/75 |
| 6,917,486 B2 * | 7/2005 | Tanner | ............ | 360/75 |
| 7,009,806 B2 * | 3/2006 | Zayas et al. | .......... | 360/78.04 |
| 7,042,673 B2 | 5/2006 | Jeong | | |
| 7,050,257 B2 * | 5/2006 | Maiocchi et al. | ....... | 360/78.04 |
| 7,082,009 B2 * | 7/2006 | Zayas et al. | .......... | 360/78.04 |
| 7,102,844 B2 * | 9/2006 | Brito | ............ | 360/75 |
| 7,342,739 B2 | 3/2008 | Park et al. | | |
| 7,375,917 B1 | 5/2008 | Fujii et al. | | |
| 7,421,359 B2 * | 9/2008 | Harmer et al. | .......... | 702/85 |
| 7,558,017 B2 | 7/2009 | Yoneda et al. | | |
| 7,800,855 B2 | 9/2010 | Kuramoto et al. | | |

(Continued)

FOREIGN PATENT DOCUMENTS

JP 11-025626 1/1999

(Continued)

OTHER PUBLICATIONS

Notice of Reasons for Rejection mailed by the Japanese Patent Office on Nov. 2, 2010 in the corresponding Japanese patent application No. 2009-173506 in 4 pages.

(Continued)

*Primary Examiner* — Hoa T Nguyen
*Assistant Examiner* — James L Habermehl
(74) *Attorney, Agent, or Firm* — Knobbe, Martens, Olson & Bear LLP

(57) ABSTRACT

According to one embodiment, an estimation method comprises measuring and creating. The measuring is configured to measure a head velocity and a terminal voltage of a coil of a voice coil motor at least two times before unload in a control system eliminating an influence caused by a transient response of inductance of the voice coil motor. The calculating is configured to a calculate torque constant and a coil resistance based on command voltages and at least two measured head velocities and terminal voltages of the coil.

15 Claims, 9 Drawing Sheets

U.S. PATENT DOCUMENTS

| | | |
|---|---|---|
| 2005/0168862 A1 | 8/2005 | Jeong |
| 2006/0007591 A1 | 1/2006 | Park et al. |
| 2007/0258163 A1 | 11/2007 | Yoneda et al. |
| 2008/0123216 A1 | 5/2008 | Kuramoto et al. |

FOREIGN PATENT DOCUMENTS

| | | |
|---|---|---|
| JP | H11-025626 | 1/1999 |
| JP | 2001-067765 | 3/2001 |
| JP | 2001-155455 | 6/2001 |
| JP | 2001-344918 | 12/2001 |
| JP | 2002-367307 | 12/2002 |
| JP | 2005-174539 | 6/2005 |
| JP | 2006-040520 | 2/2006 |
| JP | 2007-293980 | 11/2007 |
| JP | 2008-123651 | 5/2008 |
| JP | 4180582 | 9/2008 |

OTHER PUBLICATIONS

Notice of Reasons for Rejection mailed by the Japanese Patent Office on Jan. 25, 2011 in the corresponding Japanese patent application No. 2009-173506 in 6 pages.

* cited by examiner

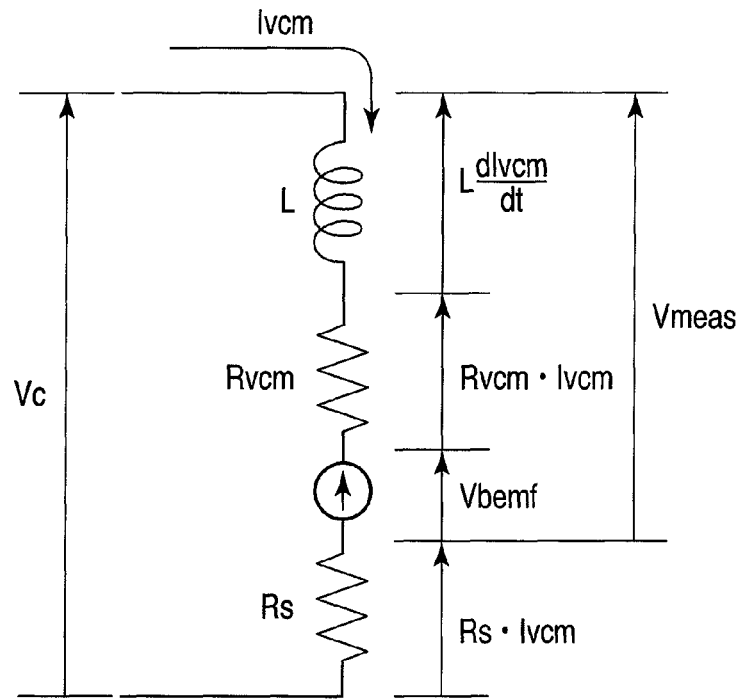
F I G. 2
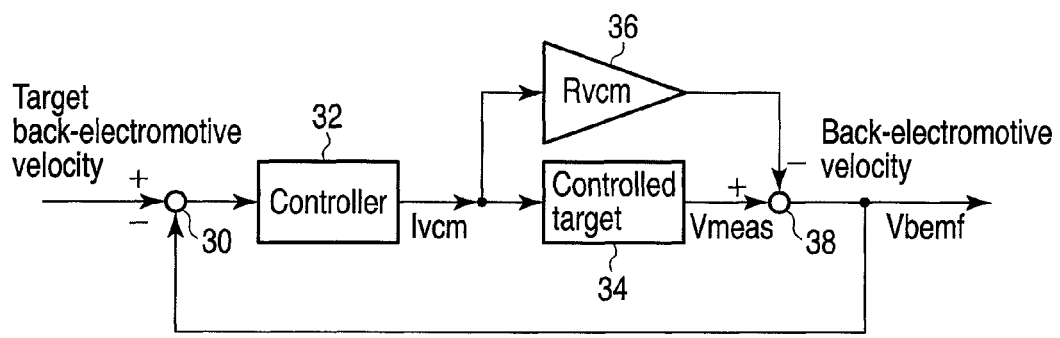
F I G. 3

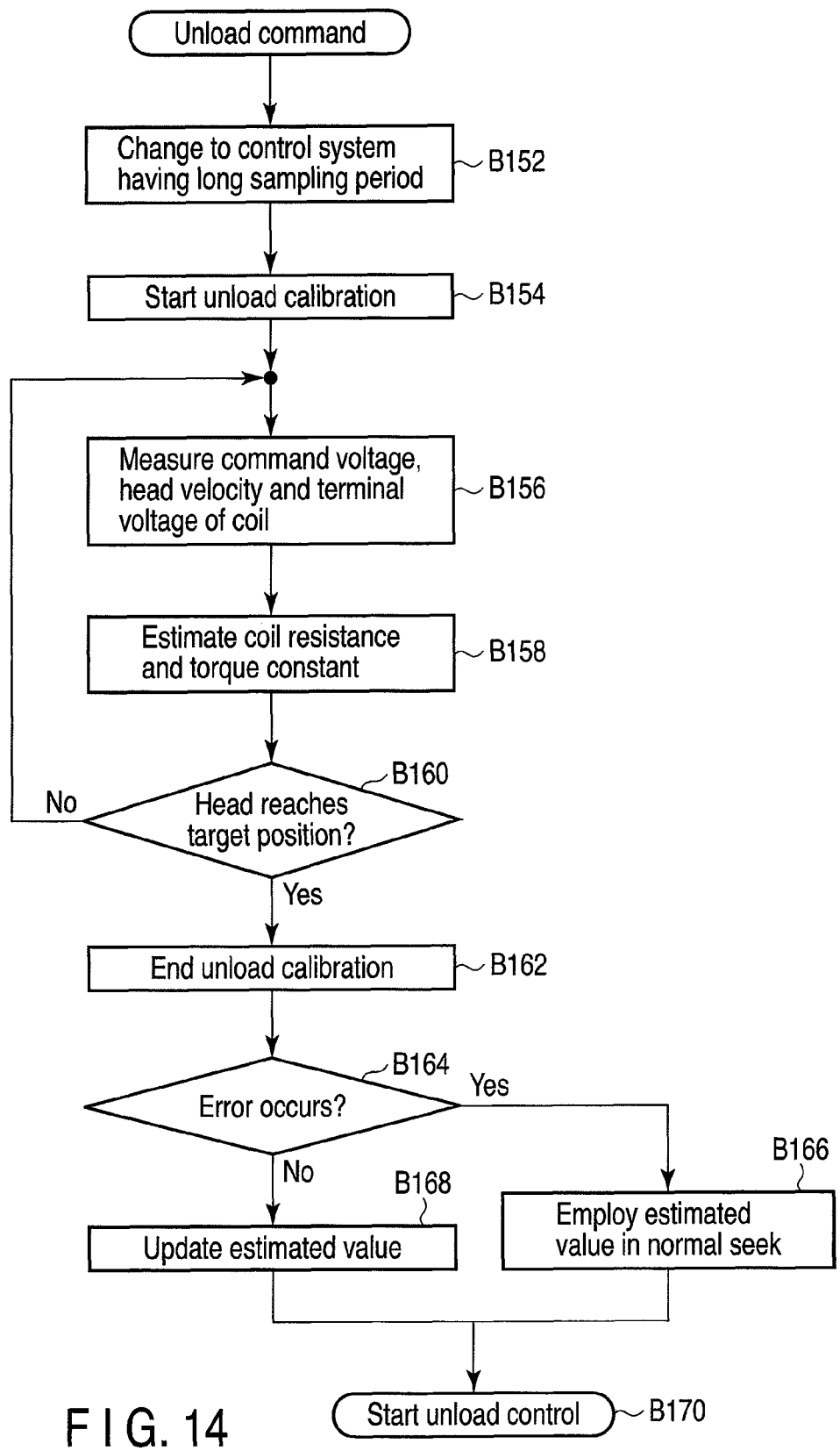
F I G. 14

LOAD/UNLOAD CONTROL METHOD AND APPARATUS FOR A MAGNETIC DISK DRIVE

CROSS-REFERENCE TO RELATED APPLICATIONS

This application is based upon and claims the benefit of priority from Japanese Patent Application No. 2009-173506, filed Jul. 24, 2009; the entire contents of which are incorporated herein by reference.

FIELD

Embodiments described herein relate generally to a load/unload control method and apparatus for a magnetic disk drive.

BACKGROUND

In a magnetic disk drive, the following motions (load/unload) are defined. Specifically, in order to prevent a contact of a head with a disk surface, the head is removed from the disk surface onto a ramp mechanism if an impact is given to a magnetic disk drive and at the time of power-off or idling. This motion is hereinafter referred to as an unload. Further, when the head is moved from the ramp mechanism to the disk surface, this motion is hereinafter referred to as a load.

Further, in the magnetic disk drive, a head positioning control system controls a head based on a head position error signal (PES signal) obtained by reproducing data included in a servo sector. However, it is impossible to obtain a head position error signal when a head is positioned on a ramp mechanism without being positioned on a disk surface in the foregoing load/unload motions. For this reason, generally, the following control is carried out. Specifically, a head velocity is estimated from a back electromotive voltage generated in a voice coil motor (VCM) for moving a head. Therefore, the velocity control of the head is carried out based on the foregoing estimated value.

When a head velocity is estimated from a back electromotive voltage, a drop in voltage caused by a coil resistance is subtracted from a detected terminal voltage of the coil shown in the following equation (1).

Back electromotive voltage=terminal voltage of coil−
    coil resistance×coil current    (1)

In the foregoing equation (1), the coil resistance is a previously known constant. However, if a magnetic disk drive is used for a long time, a temperature change occurs due to the influence of a coil current; as a result, a coil resistance changes. Moreover, there is a high probability of resistances varying due to a change in individual coil resistances.

Therefore, there is a need to obtain an accurate coil resistance before load/unload is carried out. Patent document 1 (Japanese Patent No. 4,180,582) discloses an apparatus for estimating a coil resistance in a load motion. In the foregoing apparatus, a current is carried so that a head gimbal assembly (HGA) is urged against the ramp mechanism dead-end direction, and then, a coil resistance is estimated in a state that a back electromotive voltage is set to 0. Further, Patent document 2 (Jpn. Pat. Appln. KOKAI Publication No. 11-25626) discloses the following method. According to the foregoing method, in an unload motion, a head gimbal assembly (HGA) is urged against a stopper on the disk inner circumferential side. However, the probability of a contact of a head with a disk surface is high; for this reason, the foregoing method is not preferable. Therefore, there is a need to estimate a coil resistance before an unload motion using a method similar to a normal seek operation.

Furthermore, Patent document 3 (Jpn. Pat. Appln. KOKAI Publication No. 2001-344918 (paragraph [0013])) discloses the following apparatus. According to the foregoing document 3, a back electromotive voltage $V_{bemf}$ has a proportional relationship to a velocity estimated value (i.e., back electromotive voltage $V_{bemf}$=K (proportional gain)×velocity estimated value). The foregoing proportional gain K is already known; therefore, the velocity estimated value is obtained, and thereby, a back electromotive voltage $V_{bemf}$ is inevitably obtained. However, if individual variations and changes occur in proportional gain K, there is a possibility that inaccurate estimation is performed.

According to a conventional case, it is impossible to estimate a coil resistance using a method similar to a normal seek operation.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 2 is an exemplary circuit diagram showing a voice coil motor (VCM) used for a hard disk drive shown in FIG. 1.

FIG. 3 is an exemplary view showing a velocity control system model used for a load/unload control.

FIG. 14 is an exemplary flowchart to explain a process of estimating a coil resistance and a torque constant from two arbitrary points.

DETAILED DESCRIPTION

Various embodiments will be described hereinafter with reference to the accompanying drawings.

In general, according to one embodiment, an estimation method comprises measuring and creating. The measuring is configured to measure a head velocity and a terminal voltage of a coil of a voice coil motor at least two times before unload in a control system eliminating an influence caused by a transient response of inductance of the voice coil motor. The calculating is configured to a calculate torque constant and a coil resistance based on command voltages and at least two measured head velocities and terminal voltages of the coil.

Figure 1A:
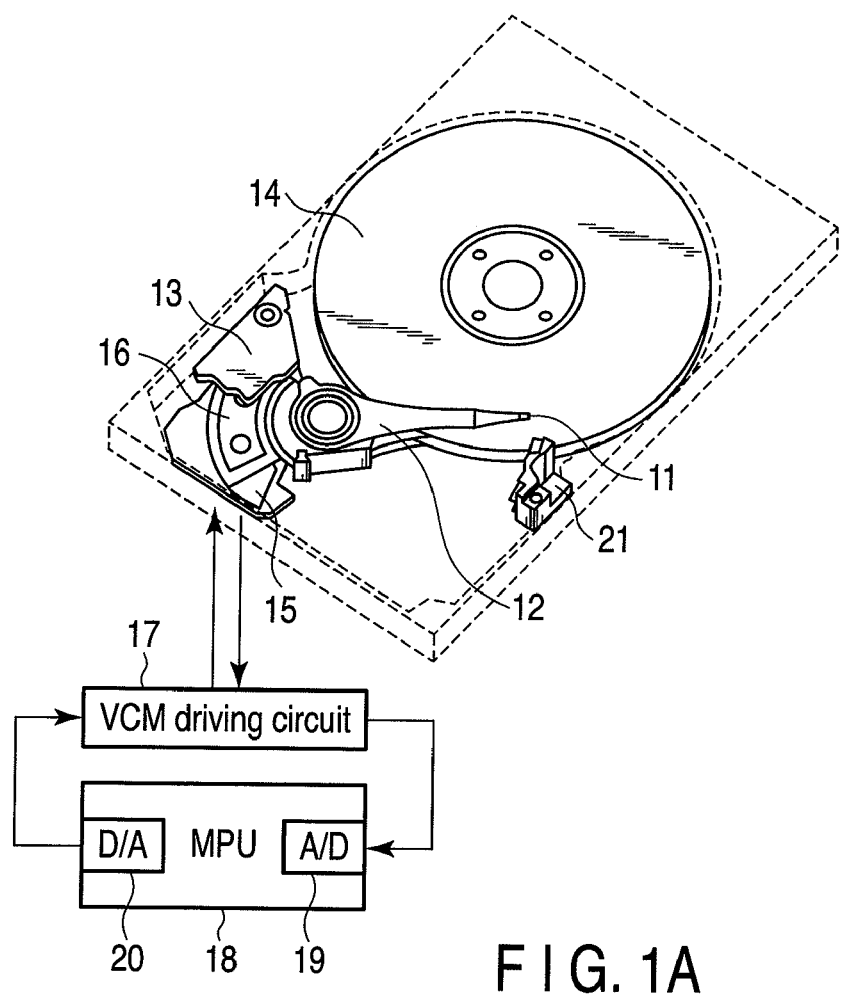
FIG. 1A and FIG. 1B are exemplary views schematically showing the configuration of a hard disk drive according to an embodiment.
Figure 1B:
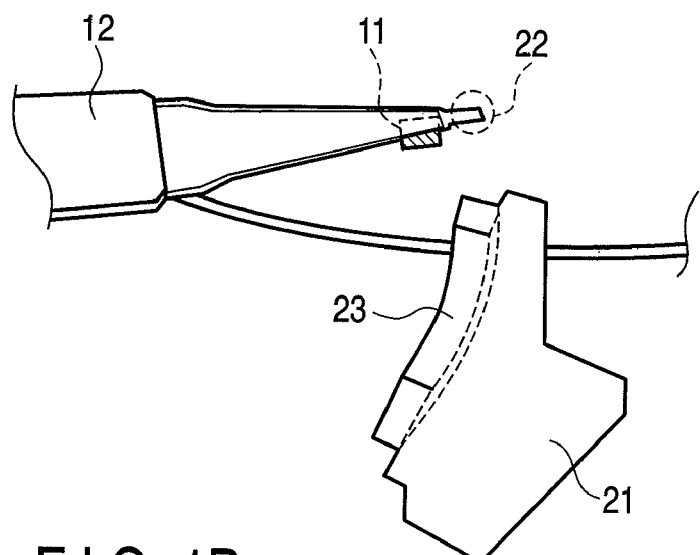

FIG. 1A and FIG. 1B are views schematically showing the configuration of a hard disk drive including a load/unload control system according to this embodiment. As shown in FIG. 1A, a magnetic disk drive is provided with a load/unload control system. The load/unload control system mainly comprises a micro processor unit (MPU) 18. Although not illustrated, the MPU 18 includes a memory (ROM, flash memory) stored with a load/unload control program (firmware). A head 11 is supported by an arm 12. The proximal end of the arm 12 is provided with a voice coil motor (VMC) 13. A current is supplied to the VCM 13 so that the arm 12 is rotatably driven, and thereby, the head 11 is controlled so that it is positioned on a desired track. The VCM 13 comprises a magnet 15 and a coil 16. The MPU 18 includes an analog-to-digital (A/D) converter 19 and a digital-to-analog (D/A) converter 20. The MPU 18 supplies a VCM control signal to the coil 16 by way of the D/A converter 20, and then, information detected by the coil 16 is supplied to the MPU 18 by way of the A/D converter 20.

If an impact is given to a magnetic disk drive, as well as in power-off or idling, the arm 12 is rotatably driven so that the head 11 is removed from a disk onto a ramp mechanism 21. The foregoing operation is called "unload." As seen from FIG. 1B, the distal end of the head 11 is provided with a tab 22. In the foregoing unload, the tab 22 is placed on a slop 23. Moreover, an operation of moving the head 11 from the ramp mechanism 21 to the surface of a disk 14 is called "load."

Positioning control is carried out with respect to a track on the surface of the disk 14 so that a magnetic disk drive reads and writes data on the surface of the disk 14. In this case, head positional information is calculated using a position error signal from the disk center previously recorded on a magnetic disk surface, that is, a PES signal, and a current velocity is calculated from the present position of the head; in this way, velocity control is carried out. However, the foregoing PES signal is not obtained on the ramp mechanism 21. Considering the foregoing circumstances, the following velocity control system is constructed in order to control a load/unload velocity of the head. The velocity control system estimates a velocity from a back electromotive voltage signal because a coil back electromotive voltage generated in the coil 16 driving the arm 12 is equal to a value proportional to a head velocity.

FIG. 2 is a circuit diagram showing the configuration of a VCM 13. In a magnetic disk drive, a measurable terminal voltage of a coil $V_{meas}$ is a value obtained by subtracting a voltage drop due to a sense resistance Rs from a terminal voltage of a coil Vc. This is expressed by the following equation (2).

$$V_{meas} = V_c - R_s \times I_{vcm} \quad (2)$$

$$= L(dI_{vcm}/dt) + R_{vcm} \times I_{vcm} + V_{bemf}$$

where, L is inductance, $I_{vcm}$ is a coil current, $R_{vcm}$ is a coil resistance, and $V_{bemf}$ is a back electromotive voltage.

Hereinafter, $V_{meas}$ is defined as a terminal voltage of a coil. A back electromotive voltage generated in a coil obtained from the foregoing equation (2) is substituted into the following equation (3).

$$V_{bemf} = V_{meas} - L(dI_{vcm}/dt) - R_{vcm} \times I_{vcm} \quad (3)$$

The foregoing back electromotive voltage $V_{bemf}$ is proportional to a head velocity Vel (proportional gain is set as a torque constant Kt); therefore, it is expressed as $V_{bemf} = Kt \times Vel$. When this $V_{bemf} = Kt \times Vel$ is applied to the foregoing equation (3), a head velocity Vel is expressed by the following equation (4).

$$Vel = (V_{meas} - L(dI_{vcm}/dt) - R_{vcm} \times I_{vcm})/Kt \quad (4)$$

A coil current $I_{vcm}$ is generated based on a command voltage $V_{vcm}$, and current feedback effectively functions. Assuming that the foregoing matters are established, the coil current $I_{vcm}$ is proportional to the command voltage $V_{vcm}$; therefore, a proportional coefficient $\alpha$ is used, and thereby, the coil current $I_{vcm}$ is expressed as $I_{vcm} = \alpha \times V_{vcm}$. Further, an unload control system is constructed by a discrete time system. Thus, when a command voltage changes, the influence of a transient response of a voltage change by inductance sufficiently attenuates, and thereafter, measurement is carried out. In this case, the influence of an inductance item is capable of being eliminated.

FIG. 3 is a circuit diagram showing a velocity control system model used for load/unload control, which is realized by the firmware of the MPU 18 and satisfies the foregoing two points. A subtracter 30 is supplied with a velocity (referred as back-electromotive velocity) estimated from a back electromotive voltage and a target velocity (i.e., target back-electromotive velocity). Then, a controller 32 is supplied with the difference between the foregoing two velocities. The controller 32 supplies a coil current $I_{vcm}$ to a controlled target. In this case, the coil current $I_{vcm}$ is proportional to a command voltage $V_{vcm}$ due to current feedback determining a command voltage $V_{vcm}$ from the difference between the input target back-electromotive velocity and the target velocity. As can be seen from the foregoing description, the inductance item is ignorable. Therefore, a subtracter 38 subtracts a voltage drop caused by a coil resistance $R_{vcm}$ from the measured terminal voltage of the coil $V_{meas}$ to find a back electromotive voltage $V_{bemf}$.

According to the foregoing control system, the equation (4) is simplified as shown in the following equation (5).

$$Vel = (V_{meas} - R_{vcm} \times \alpha \times V_{vcm})/Kt \quad (5)$$

In the foregoing equation (5), the foregoing terminal voltage of the coil $V_{meas}$ and command voltage $V_{vcm}$ are measurable values. On the other hand, the foregoing coil resistance $R_{vcm}$ and torque constant Kt change due to a temperature change caused by heat generated in an operation and the influence of individual variations. For this reason, if a fixed value is used as the foregoing coil resistance $R_{vcm}$ and torque constant Kt, this is a factor causing an error in an estimated velocity Vel. In order to solve the problem, there is a need to accurately estimate coil resistance $R_{vcm}$ and torque constant Kt using an operation (unload calibration seek operation) equivalent to a normal seek operation before unload control is carried out.

According to this embodiment, the following two methods are given as the method of eliminating the influence of a transient response caused by the inductance item in the equation (4) to estimate a coil resistance $R_{vcm}$ and a torque constant Kt.

(1) Method of estimating a coil resistance $R_{vcm}$ and a torque constant Kt using saturation of a command voltage in acceleration in a normal positioning control system on a velocity measurable disk surface; and (2) Method of estimating a coil resistance $R_{vcm}$ and a torque constant Kt using a control system of carrying out a measurement after the influence of a transient response of inductance caused by a change of a coil current sufficiently attenuates.

First, the former method (1) will be detailed explained below.

According to a normal seek control system, a sampling period is short; for this reason, a change of voltage by inductance does not attenuate due to a change of a command voltage. Therefore, the inductance item shown in the equation (5) is not eliminated. When the relation of $I_{vcm} = \alpha \times V_{vcm}$ is applied to the equation (4), the following equation (6) is expressed.

$$\text{Vel} = (V_{meas} - L \times \alpha \times (dV_{vcm}/dt) - R_{vcm} \times \alpha \times V_{vcm})/Kt \quad (6)$$

Namely, the inductance item remains in the foregoing equation (6). In order to obtain a head velocity Vel, a time change of a command voltage $V_{vcm}$ is required, but it is impossible to actually obtain an accurate time change. However, if a specified command voltage is applied, a time change of the command voltage becomes zero; therefore, it can be seen that the foregoing equation (5) is established. Thus, when a specified command voltage is applied, measurable head velocity Vel, terminal voltage of the coil $V_{meas}$ and command voltage $V_{vcm}$ are handled as already-known values. As a result, two limited elements only, that is, the coil resistance $R_{vcm}$ and the torque constant Kt are given as unknown quantities.

Figure 4:
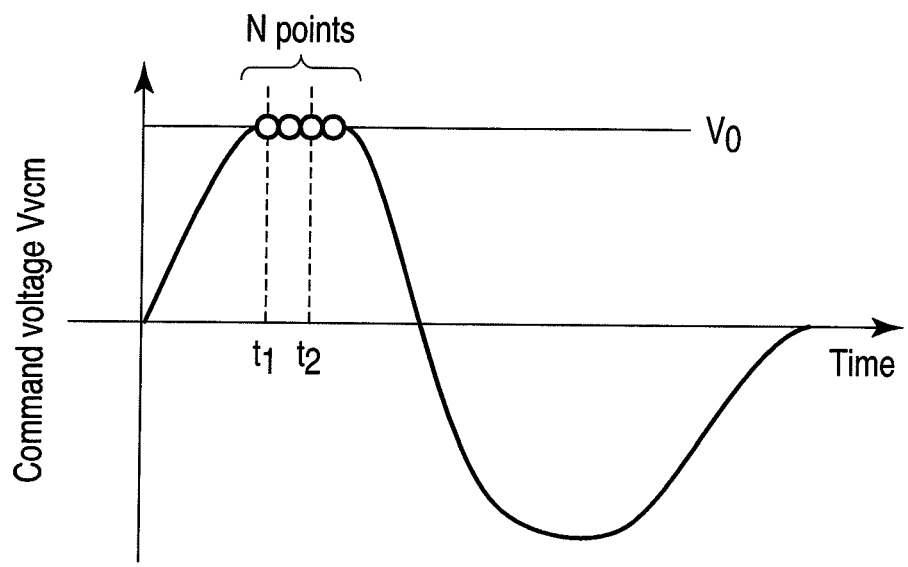
FIG. 4 is an exemplary chart showing a waveform of a command voltage used for unload calibration seek in a method of saturating a command voltage when a head is accelerated.
Figure 5:
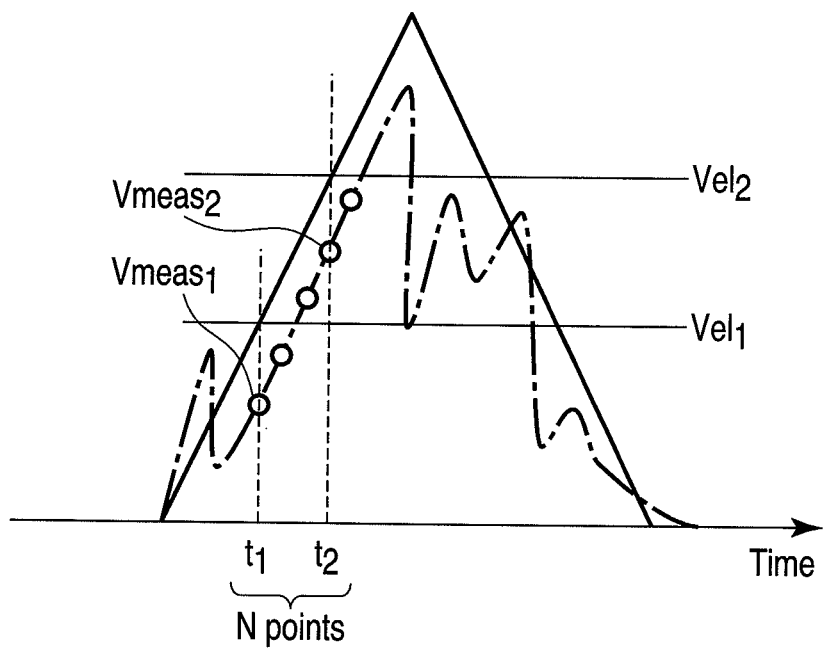
FIG. 5 is an exemplary chart showing a change of a terminal voltage of a coil and a head velocity when a command voltage is given to perform a seek operation as shown in FIG. 4.

A method of saturating a command voltage in head acceleration is proposed as an estimation method of satisfying the foregoing conditions. FIG. 4 is a chart showing a waveform of a command voltage $V_{vcm}$ in an unload calibration seek operation. As is evident from FIG. 4, a command voltage is saturated only in acceleration. FIG. 5 is a chart showing each change of a terminal voltage of the coil $V_{meas}$ and a head velocity Vel when a command voltage $V_{vcm}$ shown in FIG. 4 is applied to perform a seek operation. For example, data measured at two time points $t_1$ and $t_2$ when the command voltage shown in FIG. 4 and FIG. 5 is saturated (saturated command voltage is set as $V_0$) are set as head velocity $\text{Vel}_1$, $\text{Vel}_2$, and terminal voltages of a coil $V_{meas1}$, $V_{meas2}$. In this way, the following equations (7) and (8) are obtained.

$$Kt \times \text{Vel}_1 = V_{meas1} - R_{vcm} \times \alpha \times V_0 \quad (7)$$

$$Kt \times \text{Vel}_2 = V_{meas2} - R_{vcm} \times \alpha \times V_0 \quad (8)$$

When the foregoing equations (7) and (8) are solved with respect to a torque constant Kt, the following equation (9) is obtained.

$$Kt = (V_{meas1} - V_{meas2})/(\text{Vel}_{1} - \text{Vel}_2) \quad (9)$$

Thus, based on the foregoing equations (7) and (8), a coil resistance is obtained from the following equation (10); therefore, it can be seen that estimation is possible.

$$R_{vcm} = (\text{Vel}_1 \times V_{meas2} - \text{Vel}_2 \times V_{meas1})/(\alpha \times V_0 \times (\text{Vel}_1 - \text{Vel}_2)) \quad (10)$$

Figure 6:
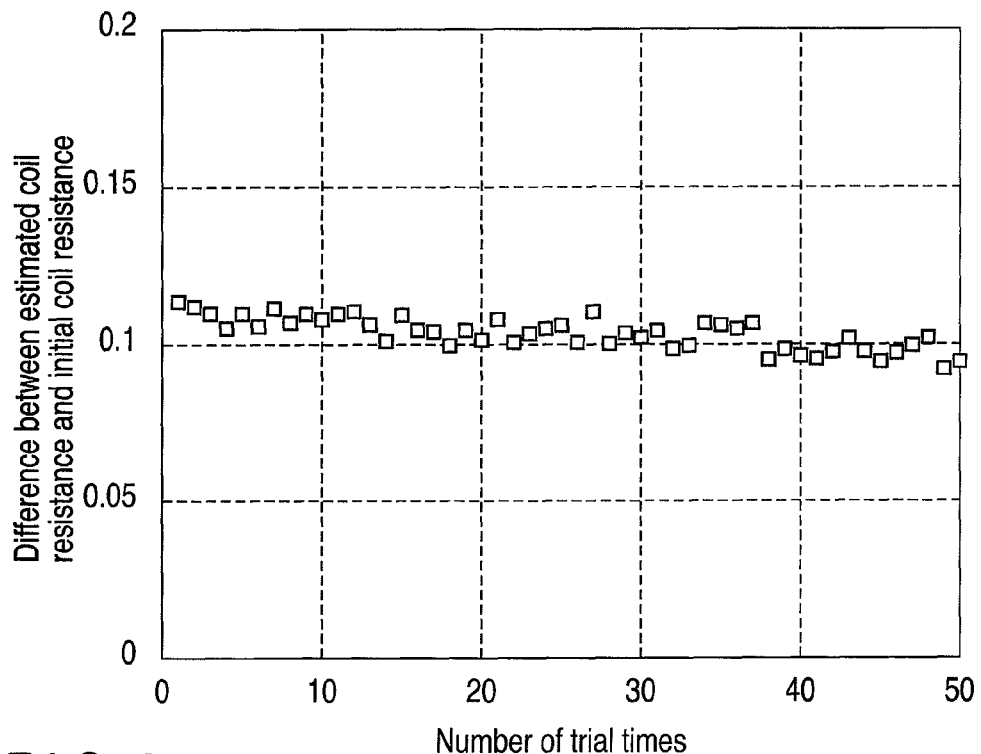
FIG. 6 is an exemplary graph to explain the difference between a coil resistance estimated result by a method of saturating a command voltage in acceleration only and the initial value of an actual coil resistance.

According to this embodiment, an estimator was installed in a magnetic disk drive, and the difference between a coil resistance estimated result and the actual coil resistance initial value was measured, using the method of only saturating a command voltage in acceleration proposed by the embodiment. The measured result is shown in FIG. 6. In this case, a coil resistance was set about $0.1\Omega$ larger than a reference value, and thereafter, the coil resistance was continuously measured 50 times. As seen from FIG. 6, the difference between the reference value and the estimated coil resistance was approximately the same, that is, about $0.1\Omega$. Therefore, it can be seen that the coil resistance was correctly estimated.

According to this embodiment, the case of sampling two points, that is, $t=t1$, $t=t2$ to estimate a coil resistance is given as one example. In this case, the foregoing equation (10) is established with respect to data acquired from two arbitrary points so long as sampling is within a saturated period of a command voltage. Therefore, data is acquired with respect to point N (N=an arbitrary positive number of 3 or more), and thereafter, the equation (10) is calculated by the arbitrary number of times in a range from one combination to $_NC_2$ combinations. In this way, the average or center value of these calculations may be estimated as the final coil resistance. Moreover, the case where a distance between measuring points is far as much as possible is hard to receive the influence caused by noise compared with the case where measuring points are close in a period of time. Therefore, data calculated from the first point and the final point N may be used as a coil resistance estimated value. In addition to the foregoing method, various statistical processes are carried out with respect to the estimated coil resistance, and thereafter, the coil resistance thus estimated may be determined as the final estimated value.

When the equation (10) is applied to the equation (5), the following equation (11) is obtained; therefore, it can be seen that a back electromotive voltage is estimated.

$$V_{bemf} = V_{meas} - ((\text{Vel}_1 \times V_{meas2} - \text{Vel}_2 \times V_{meas1})/(\alpha \times V_0 \times (\text{Vel}_1 - \text{Vel}_2))) \times V_{vcm} \quad (11)$$

According to this method, the back electromotive voltage is estimated from all measured data without using a constant; therefore, it is accurately estimated. Moreover, the following matter is given as an estimation condition. Namely, the condition is that a command voltage to eliminate the influence of a time change of a command voltage by inductance is constant. Therefore, this method is applicable so long as a command voltage is saturated in a normal seek operation in addition to an unload calibration seek operation. Further, the command voltage is saturated in acceleration only; conversely, it is not saturated in deceleration. If the command voltage is saturated in deceleration as well as acceleration, there is a problem that it is difficult to saturate the command voltage in deceleration under the low-temperature situation in particular. Furthermore, the command voltage is saturated in deceleration, and thereafter, the waveform of the command voltage is disordered. As a result, the arm 12 vibrates; for this reason, there is a problem that the possibility of causing noise is high.

Figure 7:
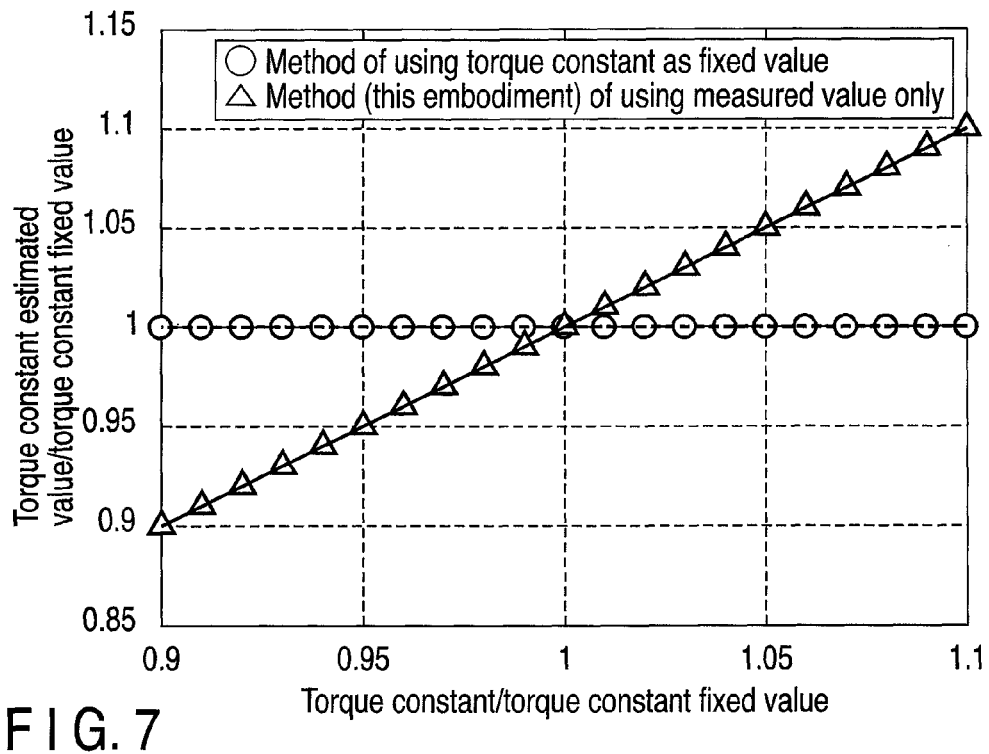
FIG. 7 is an exemplary graph to explain a change of a torque constant when a torque constant changes from a fixed value of a torque constant.
Figure 8:
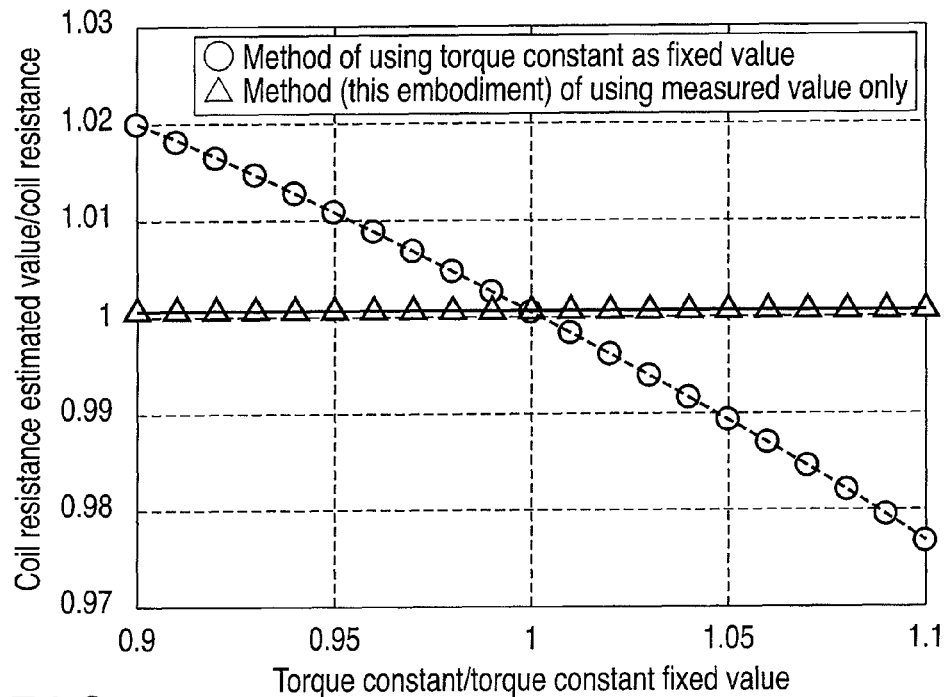
FIG. 8 is an exemplary graph to explain a change of a coil resistance when a torque constant changes from a fixed value of a torque constant.

For example, the apparatus disclosed in the foregoing Patent document 1 handles a torque constant as an already-known value (fixed value). For this reason, if the torque constant changes due to heat and individual variations, a change occurs in an estimated resistance. Simulation is carried out with respect to the case where a torque constant changes; as a result, an estimated torque constant Kt and coil resistance $R_{vcm}$ show no change. The simulation result is shown in FIG. 7 and FIG. 8. In FIG. 7, the horizontal axis shows a torque constant/torque constant fixed value, and the vertical axis shows a torque constant estimated value/torque constant fixed value. In FIG. 8, the horizontal axis shows a torque constant/ torque constant fixed value, and the vertical axis shows a coil resistance estimated value/coil resistance. As is evident from FIG. 7 and FIG. 8, this method can estimate a coil resistance without receiving the influence caused by parameter changes such as individual variations.

Figure 9:
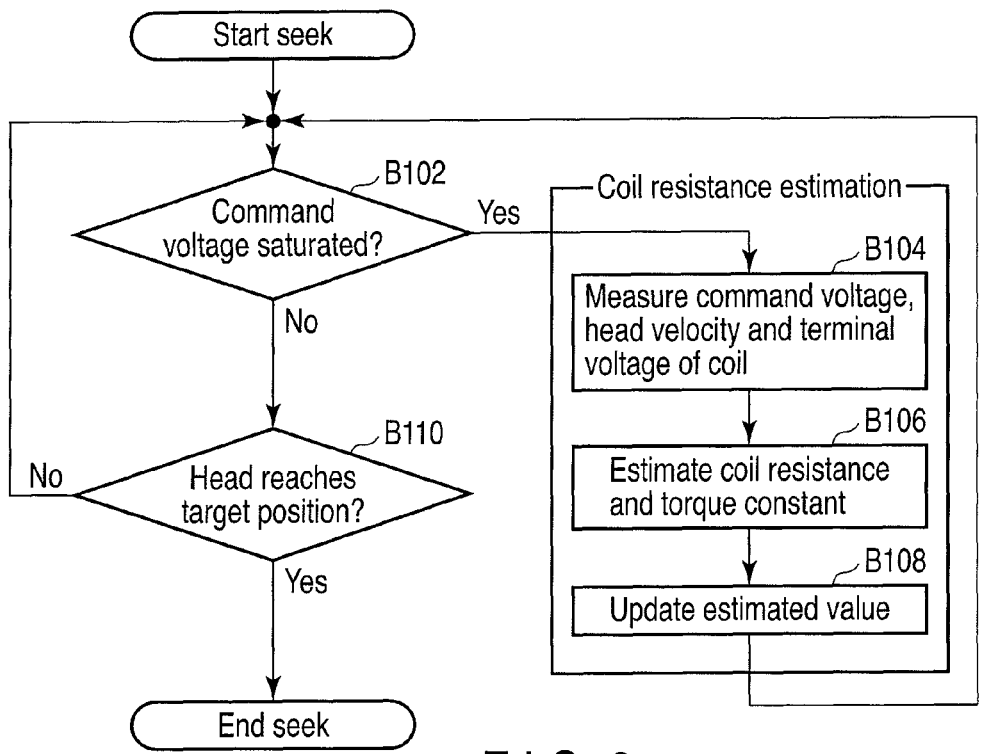
FIG. 9 is an exemplary flowchart to explain a process of estimating a coil resistance and a torque constant when a normal seek control system is operated.
Figure 10:
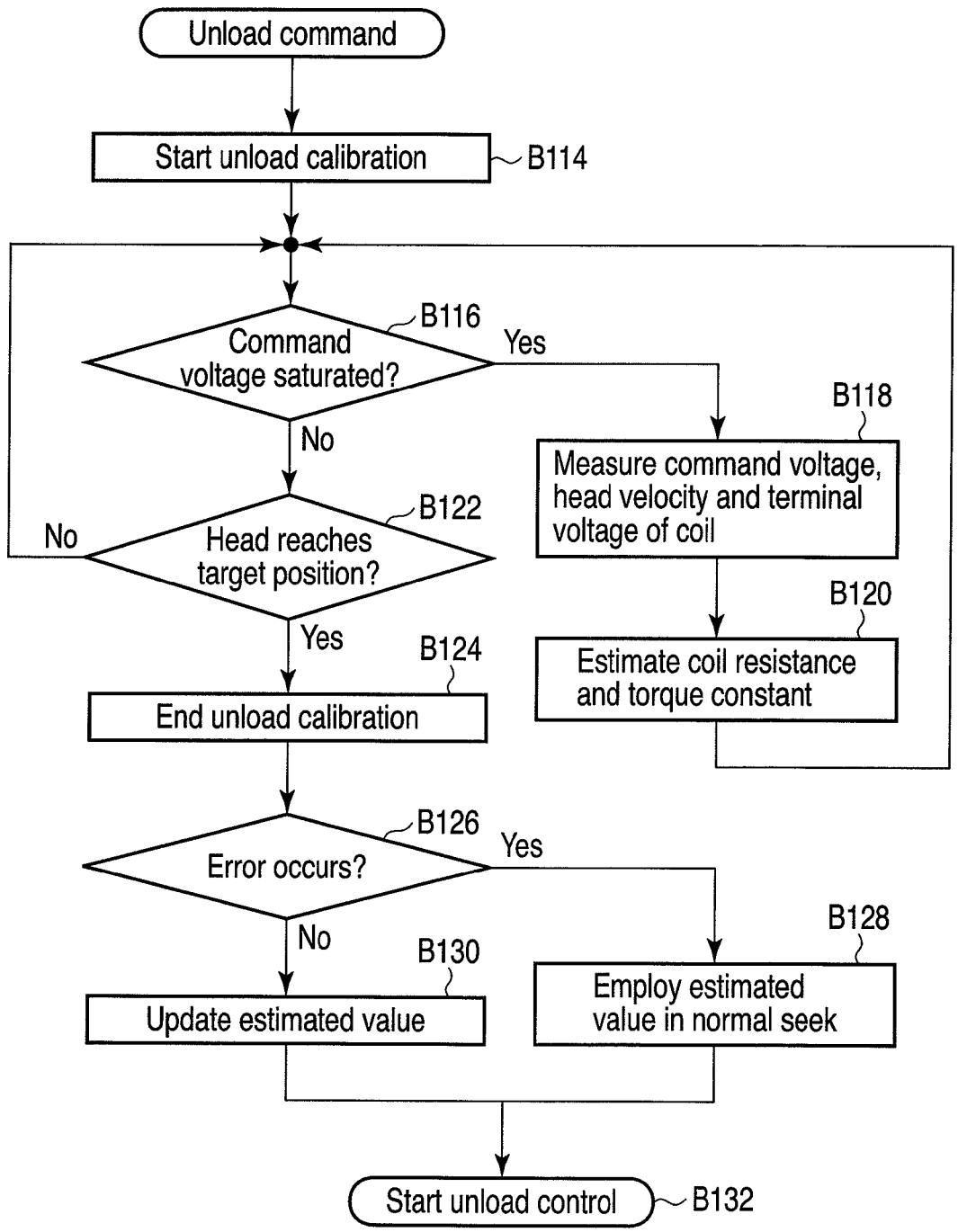
FIG. 10 is an exemplary flowchart to explain a process of estimating a coil resistance and a torque constant in an unload calibration seek operation.

FIG. 9 and FIG. 10 show flowcharts to estimate a coil resistance and a torque constant according to this method. For example, the following two ways are given as timing of carrying out estimation. One is a timing of carrying out a special seek operation (unload calibration seek) for issuing an unload operation command during the operation of a normal seek control system, and for estimating a coil resistance and a torque constant before an unload operation. The other is a timing of saturating a command voltage during the operation of a normal seek control system. The former timing can acquire a more accurate value than the latter timing. However, according to a one-time limited unload calibration seek operation; there is the possibility that positional signal reading fails. Considering such a case, if a coil current (proportional to command voltage) is saturated during the operation of a normal seek control system, the same measurement as above is carried out, and then, data is updated upon every measurement. In this way, even if positional signal reading fails in a previous unload calibration seek operation, a value close to the foregoing data is usable.

FIG. 9 is a flowchart to explain a process of estimating a coil resistance and a torque constant during the operation of a normal seek control system. When seek is started, it is determined in block B102 whether or not a command voltage is saturated (i.e., does not change for a predetermined period). If the command voltage is saturated, the flow proceeds to a process of estimating a coil resistance $R_{vcm}$. First, in block B104, a command voltage $V_{vcm}$, a head velocity Vel and a terminal voltage of a coil $V_{meas}$ are measured at two or more arbitrary points. In this case, the foregoing head velocity Vel and the terminal voltage of the coil $V_{meas}$ are measured, while the command voltage $V_{vcm}$ is obtained by an operation by firmware in the MPU 18. The head velocity Vel is measured based on a change of a track number expressed by a reproduction signal from a servo sector. The terminal voltage of a coil $V_{meas}$ is measured by means of a voltage sensor connected to the VCM 13.

In block B106, a torque constant Kt and a coil resistance $R_{vcm}$ are estimated from the foregoing equations (9) and (10). In block B108, an estimated value is updated, and thereafter, the flow returns to block B102.

Conversely, if the command voltage is not saturated, it is determined in block B110 whether or not a head reaches a target position. If the head reaches the target position, the seek operation ends. Conversely, if the head does not reach the target position, the flow returns to block B102.

As described above, even if a normal seek control system is operating, the command voltage is saturated, and thereby, the influence of a time change of the command voltage by inductance is eliminated. Therefore, based on the equations (9) and (10), it is possible to estimate a torque constant Kt and a coil resistance $R_{vcm}$ from the foregoing command voltage $V_{vcm}$, head velocity Vel and terminal voltage of a coil $V_{meas}$.

FIG. 10 is a flowchart to explain a process of estimating a coil resistance and a torque constant in an unload calibration seek operation. When an unload operation command is issued during the operation of a normal seek control system, an unload calibration seek operation is started in block B114. It is determined in block B116 whether or not a command voltage is saturated. If the command voltage is saturated, the flow proceeds to a process of estimating a coil resistance $R_{vcm}$. First, in block B118, a command voltage $V_{vcm}$, a head velocity Vel and a terminal voltage of a coil $V_{meas}$ are measured at two or more arbitrary points. In block B120, a torque constant Kt and a coil resistance $R_{vcm}$ are estimated from the foregoing equations (9) and (10). Thereafter, the flow returns to block B116.

Conversely, if the command voltage is not saturated, it is determined in block B122 whether or not a head reaches a target position. If the head does not reach the target position, the flow returns to block B116. Conversely, if the head reaches the target position, the unload calibration seek operation ends in block B124.

It is determined in block B126 whether or not an error occurs in an unload calibration seek operation. If an error occurs, a coil resistance and a torque constant estimated during the operation of a normal seek control system shown in FIG. 9 are employed in block B128, and then, unload control is started in block B132. Conversely, if an error does not occur, the foregoing coil resistance and torque constant estimated in block B120 are updated in block B130, and then, unload control is started in block B132. According to the foregoing unload control, a back electromotive voltage is obtained based on the estimated coil resistance and torque constant. Further, a head velocity is estimated from the obtained back electromotive voltage, and then, based on the estimated value, velocity control of the head is carried out.

According to the unload calibration seek shown in FIG. 10, the saturated command voltage is freely settable. In a normal seek operation, the positioning time and seek distance are both limited; for this reason, seek must be carried out at the maximum acceleration. Therefore, a saturation voltage must be set to a high voltage to some degree. However, in the unload calibration seek operation, the limits of seek distance and time are relaxed. Therefore, it is effective to set, as a fixed value, a low command voltage that is easily saturated compared with a normal seek operation.

The latter method (2) will be explained below. FIG. 9 and FIG. 10 show the method of estimating a coil resistance and a torque constant using saturation of a command voltage in acceleration in a normal seek control system. However, a voltage transient response caused by inductance by a change of a coil current sufficiently attenuates, and thereafter, measurement is carried out. According to the foregoing measurement, calibration is possible without using saturation of a command voltage. In this case, a sampling period must be set in accordance with the inductance; however, any waveforms of various command voltages can be given.

Figure 11:
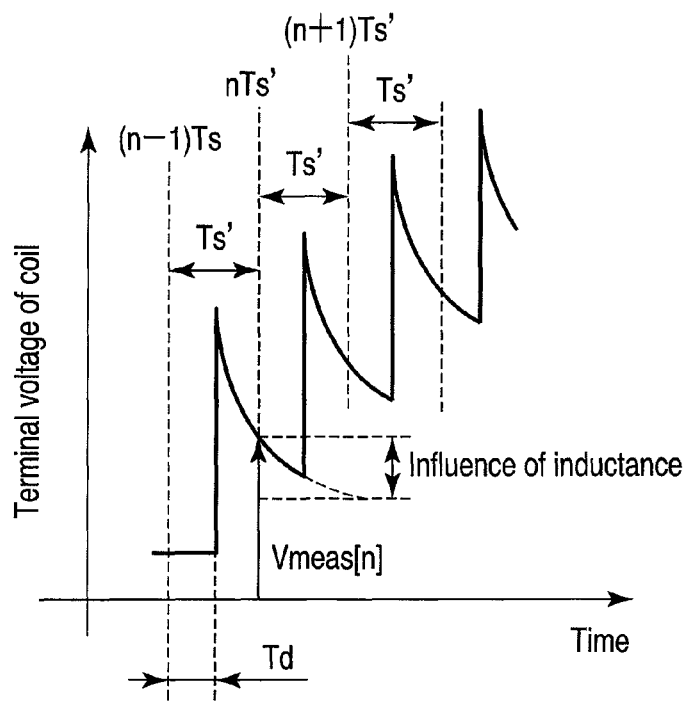
FIG. 11 is an exemplary graph to explain the relationship between a relatively short sampling period and a terminal voltage of a coil.
Figure 12:
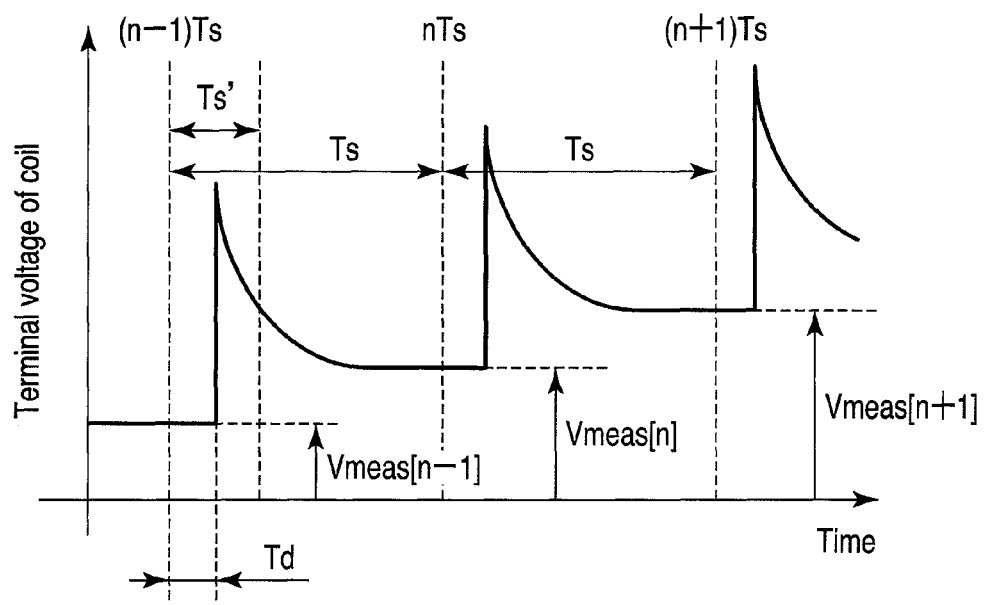
FIG. 12 is an exemplary graph to explain the relationship between a relatively long sampling period and a terminal voltage of a coil.

FIG. 11 and FIG. 12 are views showing the relationship between a sampling period and a terminal voltage of a coil. A command voltage does not rapidly change, but changes stepwise. As shown in FIG. 2, the VCM 13 includes inductance; therefore, the influence caused by inductance remains in a terminal voltage of a coil due to a transient response of a change of a coil current. In FIG. 11 and FIG. 12, there is shown the relationship between a sampling period and a terminal voltage of a coil. Data is measured, and thereafter, a coil current changes for an operation time delay Td. A transient response of inductance is caused by the influence of the foregoing delay. As seen from FIG. 11, a sampling period is set short, and then, the next measurement is carried out at a timing when the attenuation of a transient response is insufficient. In this case, a terminal voltage of a coil includes the influence of a transient response of inductance.

However, as seen from FIG. 12, a sampling period is set long, and then, a terminal voltage of a coil is measured after a transient response of inductance caused by a change of a coil current sufficiently converges. In this way, it is possible to accurately obtain a back electromotive voltage from a terminal voltage of a coil and a voltage drop caused by a coil resistance.

Figure 13:
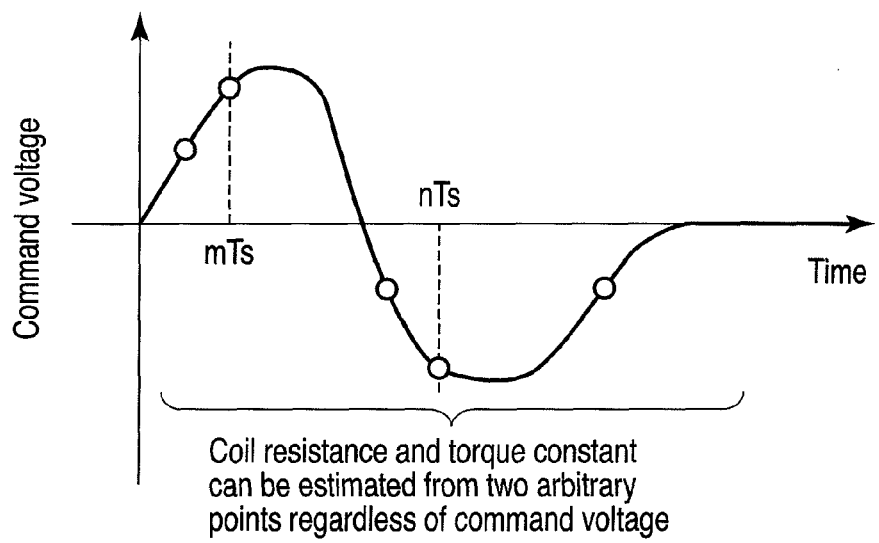
FIG. 13 is an exemplary chart showing a waveform of a command voltage waveform when a coil resistance and a torque constant are estimated from two arbitrary points.

When a sampling period is set as Ts, for example, times at two measuring points are expressed as mTs and nTs, as shown in FIG. 13. Data, for example, head velocities are set at individual times $Vel_m$, $Vel_n$, terminal voltages of a coil are set as $V_{measm}$, $V_{measn}$, and command voltages before one sampling of each measuring data are set as $V_{m-1}$, $V_{n-1}$. In this way, the following equations (12) and (13) are obtained.

$$Kt \times Vel_m = V_{measm} - R_{vcm} \times \alpha \times V_{m-1} \quad (12)$$

$$Kt \times Vel_n = V_{measn} - R_{vcm} \times \alpha \times V_{n-1} \quad (13)$$

When the foregoing equations (12) and (13) are solved with respect to a torque constant Kt, the following equation (14) is obtained.

$$Kt = (V_{m-1} \times V_{measn} - V_{n-1} \times V_{measm}) / (Vel_n \times V_{m-1} - Vel_m \times V_{n-1}) \quad (14)$$

Thus, a coil resistance is expressed by the following equation (15) from the foregoing equations (12) and (14).

$$R_{vcm} = (Vel_m \times V_{measn} - Vel_n \times V_{measm}) / (\alpha \times (Vel_m \times V_{n-1} - Vel_n \times V_{m-1})) \quad (15)$$

In the foregoing equations (14) and (15), when the relation of $V_{m-1} = V_{n-1} = V_0$ is established, it can be seen that the equations (14) and (15) match with the equations (9) and (10), respectively. Therefore, the sampling period Ts is set so that a transient response of inductance sufficiently attenuates. According to the foregoing setting, a coil resistance and a torque constant are estimated from two or more arbitrary points regardless of a command voltage (i.e., whether or not it is saturated).

One example of a numerical value of a sampling period will be explained below. A feedback control system approximates to the following low-pass filter (equivalent to equation (16)) when a cutoff frequency is set as f and gain is set as g in a transfer function from a command voltage $V_{vcm}$ to a coil current $I_{vcm}$.

$$D(s) = g/((s/f)+1) \quad (16)$$

When a command voltage $V_{vcm}$ is set as a step input of magnitude k, a response waveform of a coil current $I_{vcm}$ is expressed by the following equation (17).

$$I_{vcm} = k \times g \times (1 - e^{-f \times t}) \quad (17)$$

Therefore, a transient response of inductance is expressed by the following equation (18).

$$L(dI_{vcm}/dt) = L \times k \times g \times f \times e^{-f \times t} \quad (18)$$

However, a terminal voltage of a coil $V_{meas}$ is detected by way of a low-pass filter; for this reason, attenuation of a transient response is delayed rather than attenuation of the foregoing equation (18). Although the sampling period depends on the magnitude of a step input, a time until the foregoing transient response of inductance approximates to 0 is set to about 300 μpsec in an installation range. Further, time delay Td from observation to control output is set to 50 μsec. Therefore, a control period is set to about 350 μsec to carry out control without considering the influence of inductance.

FIG. 14 is a flowchart to explain a process of estimating a coil resistance and a torque constant from two or more arbitrary points. When an unload operation command is issued during the operation of a normal seek control system, the control system is changed in block B152. Specifically, the control system is changed to a control system which sets a sampling period Ts so that a transient response of inductance sufficiently attenuates. The foregoing change is made by means of firmware included in the MPU 18. In block B154, unload calibration is started. In block B156, a command voltage $V_{vcm}$, a head velocity Vel and a terminal voltage of a coil $V_{meas}$ are calculated at two or more arbitrary points. In this case, the head velocity Vel and the terminal voltage of a coil $V_{meas}$ are measured by means of a velocity sensor (not shown) and a voltage sensor (not shown), respectively. In block B158, a torque constant Kt and a coil resistance $R_{vcm}$ are estimated from the foregoing equations (14) and (15).

It is determined in block B160 whether or not a head reaches a target position. If the head does not reach the target position, the flow returns to block B156. Conversely, if the head reaches the target position, an unload calibration seek operation ends in block B162.

It is determined in block B154 whether or not an error occurs during an unload calibration seek operation. If an error occurs, in block B166, a coil resistance and a torque constant estimated during the operation of a normal seek control system shown in FIG. 9 are employed, and then, unload control is started in block B170. Conversely, if an error does not occur, a coil resistance and a torque constant estimated in block B158 are updated in block B168, and then, unload control is started in block B170. According to the foregoing unload control, a back electromotive voltage is obtained based on the estimated coil resistance and torque constant. Further, a head velocity is estimated from the obtained back electromotive voltage, and thereafter, a velocity of the head is controlled based on the estimated value.

Figure 15:
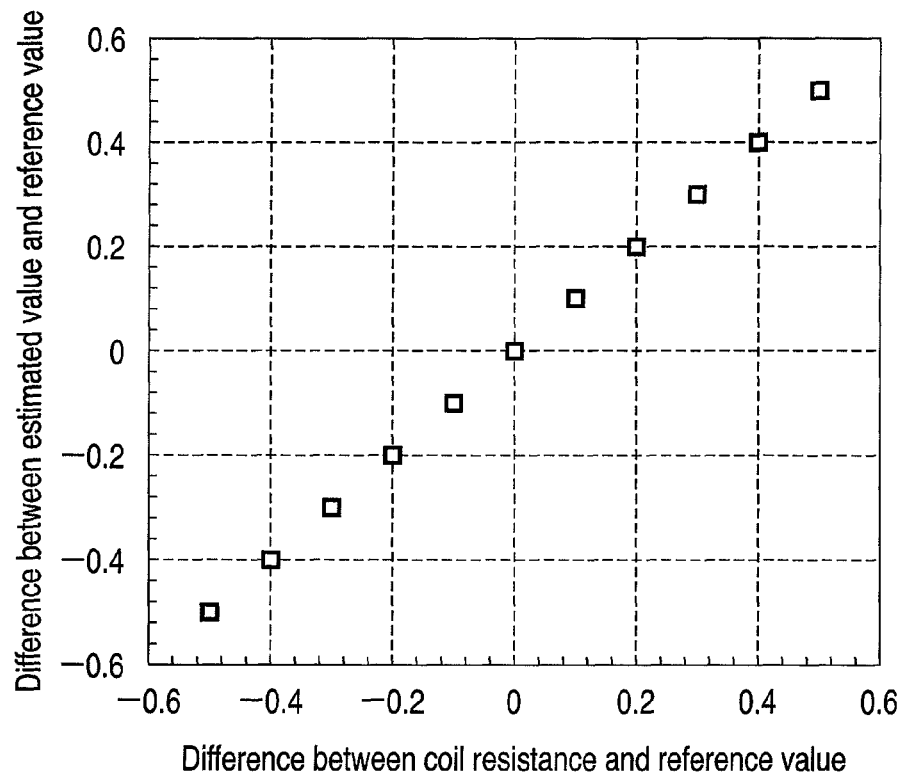
FIG. 15 is an exemplary graph showing the simulation result of the process of FIG. 14.

The efficiency of this method was verified based on the foregoing simulation. Specifically, when a coil resistance is changed by ±0.5Ω (in unit of 0.1Ω) from a reference value, the difference between an estimated value and a reference value was calculated under each condition. FIG. 15 is a graph showing the result when a command voltage is used in a ramp function. In the graph, the horizontal axis shows the difference between a coil resistance and a reference value, while the vertical axis shows the difference between an estimated value and a reference value. From the foregoing result, it can be seen that a coil resistance is correctly estimated.

This example shows the result when an input command voltage is used in a ramp function. In this case, even if various command voltages such as sine input are used, it was confirmed that a coil resistance is estimated using this method. However, in this case, the following condition must be satisfied; namely, the following equation (19) is satisfied at two measured points.

$$V_{m-1} \times Vel_n - V_{n-1} \times Vel_m \neq 0 \quad (19)$$

If this method is employed, there is no need to saturate a command voltage. Therefore, the unload calibration seek time is shortened, that is, the unload time is shortened. Moreover, even if this method is employed, the only values used to carry out calibration are the measurable values; therefore, there is no influence caused by a change of parameters and individual variations.

Moreover, in this method, measurement may be carried out at many points, not just two points, and thereafter, a more accurate estimated value may be obtained using various estimation methods such as the foregoing methods.

The foregoing embodiment relates to a velocity control in an unload motion; however, the values estimated for the foregoing unload motion may also be used in a load motion.

As described above, according to the first embodiment, a control system capable of ignoring the inductance item is realized. Thus, a voltage drop caused by a coil resistance $R_{vcm}$ is subtracted from a measured terminal voltage of a coil $V_{meas}$, and thereby, a back electromotive voltage $V_{bemf}$ is obtained. According to the foregoing control system, a head velocity Vel is obtained from a terminal voltage of a coil $V_{meas}$, a command voltage $V_{vcm}$, a coil resistance $R_{vcm}$ and a torque constant. An accurate value of the coil resistance $R_{vcm}$ and the torque constant is estimated; therefore, a head velocity can be accurately estimated.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of estimating a coil resistance and a torque constant for load and unload control of a head attached to an arm driven by a voice coil motor, the method comprising:
    measuring a head velocity and a terminal voltage of a coil of the voice coil motor at least two times before unloading in a control system wherein a back electromotive voltage of the coil is proportional to a head velocity and a coil current is proportional to a command voltage and during a period wherein the head velocity is not influenced by a transient response of inductance due to a change of the command voltage and the head velocity is determined by a mathematical equation for the terminal voltage of the coil, the command voltage, the coil resistance, and the torque constant; and
    calculating a torque constant and a coil resistance based on command voltages, at least two measured head velocities and at least two measured terminal voltages of the coil, and the mathematical equation.

2. The method of claim 1, wherein the measuring comprises measuring the head velocity and the terminal voltage of the coil of the voice coil motor at least two times during saturation of the command voltage in a control system with the command voltage saturated in acceleration of the voice coil motor.

3. The method of claim 2, wherein the measuring comprises
    measuring the head velocity and the terminal voltage of the coil of the voice coil motor at least two times in a calibration seek control system with a saturation voltage lower than a saturation voltage of a normal seek control system set when an unload command is issued during a normal seek operation.

4. The method of claim 1, wherein the measuring comprises measuring the head velocity and the terminal voltage of the coil of the voice coil motor at least two times after a transient response of inductance due to a change of a coil current of the voice coil motor sufficiently attenuates.

5. The method of claim 1, further comprising:
    measuring the head velocity and the terminal voltage of the coil of the voice coil motor at least three times; and
    calculating estimated values of three or more torque constants and three or more coil resistances based on command voltages and three or more measured head velocities and terminal voltages of the coil, and calculating an average or central value of the three or more torque constants and the three or more coil resistances or calculating a torque constant and a coil resistance based on an initial measured value and a final measured value.

6. An apparatus for estimating a coil resistance and a torque constant for load and unload control of a head attached to an arm driven by a voice coil motor, the apparatus comprising:
    a measuring module configured to measure a head velocity and a terminal voltage of a coil of the voice coil motor at least two times before unloading in a control system wherein a back electromotive voltage of the coil is proportional to a head velocity and a coil current is proportional to a command voltage and during a period wherein the head velocity is not influenced by a transient response of inductance due to a change of the command voltage and the head velocity is determined by a mathematical equation for the terminal voltage of the coil, the command voltage, the coil resistance, and the torque constant; and
    a calculating module configured to calculate a torque constant and a coil resistance based on command voltages, at least two head velocities and at least two terminal voltages of the coil measured by the measuring module, and the mathematical equation.

7. The apparatus of claim 6, wherein the measuring module is configured to measure the head velocity and the terminal voltage of the coil of the voice coil motor at least two times during saturation of the command voltage in a control system with the command voltage saturated in acceleration of the voice coil motor.

8. The apparatus of claim 7, wherein the measuring module is configured to measure the head velocity and the terminal voltage of the coil of the voice coil motor at least two times in a calibration seek control system with a saturation voltage lower than a saturation voltage of a normal seek control system set when an unload command is issued during a normal seek operation.

9. The apparatus of claim 6, wherein the measuring module is configured to measure the head velocity and the terminal voltage of the coil of the voice coil motor at least two times after a transient response of inductance due to a change of a coil current of the voice coil motor sufficiently attenuates.

10. The apparatus of claim 6, wherein
    the measuring module is configured to measure the head velocity and the terminal voltage of the coil of the voice coil motor at least three times; and
    the calculating module is configured to calculate estimated values of three or more torque constants and three or more coil resistances based on command voltages and three or more measured head velocities and three or more measured terminal voltages of the coil, and to calculate an average or central value of the three or more calculated torque constants and the three or more calculated coil resistances or to calculate a torque constant and a coil resistance based on an initial measured value and a final measured value.

11. A magnetic disk drive comprising:
    a voice coil motor configured to drive an arm comprising a head;
    a first seek module configured to control a head velocity based on a head position error signal reproduced from a disk by the head;
    a second seek module configured to calculate an estimated head velocity from a back electromotive voltage in a voice coil motor, and to control a head velocity based on the estimated head velocity; wherein the second seek module comprises:

a measuring module configured to measure a head velocity and a terminal voltage of a coil of the voice coil motor at least two times before unloading in a control system wherein a back electromotive voltage of the coil is proportional to a head velocity and a coil current is proportional to a command voltage and during a period wherein the head velocity is not influenced by a transient response of inductance due to a change of the command voltage and the head velocity is determined by a mathematical equation for the terminal voltage of the coil, the command voltage, the coil resistance, and the torque constant;

a first estimating module configured to calculate an estimated torque constant and an estimated coil resistance based on command voltages, at least two measured head velocities and terminal voltages of the coil measured by the measuring module, and the mathematical equation; and a second estimating module configured to calculate a back electromotive voltage based on the estimated torque constant and the estimated coil resistance calculated by the first estimating module and to calculate an estimated head velocity.

12. The drive of claim 11, wherein the measuring module is configured to measure the head velocity and the terminal voltage of the coil of the voice coil motor at least two times during saturation of the command voltage in a control system with the command voltage saturated in acceleration of the voice coil motor.

13. The drive of claim 12, wherein the second seek module is configured to measure the head velocity and the terminal voltage of the coil of the voice coil motor at least two times in a calibration seek control system with a saturation voltage lower than a saturation voltage for a control system of the first seek module set when an unload command is issued while the first seek module is operated.

14. The drive of claim 11, wherein the second seek module is configured to measure the head velocity and the terminal voltage of the coil of the voice coil motor at least two times in the control system after a transient response of inductance due to a change of a coil current of the voice coil motor sufficiently attenuates, when an unload command is issued during an operation of the first seek module.

15. The drive of claim 11, wherein the measuring module is configured to measure the head velocity and the terminal voltage of the coil of the voice coil motor at least three times; and the first estimating module is configured to calculate estimated values of three or more torque constants and estimated values of three or more coil resistances based on command voltages and three or more head velocities and terminal voltages of the coil, and to calculate an average or central value of the three or more torque constants and coil resistances or calculate a torque constant and a coil resistance based on an initial measured value and a final measured value.

* * * * *